United States Patent [19]

Blose et al.

[11] Patent Number: 5,423,579
[45] Date of Patent: Jun. 13, 1995

[54] TUBULAR COUPLING WITH METAL TO METAL SEAL

[75] Inventors: Thomas L. Blose; Doyle E. Reeves; Donald J. Ortloff, all of Houston, Tex.

[73] Assignee: Hydril Company, Houston, Tex.

[21] Appl. No.: 458,732

[22] Filed: Jan. 17, 1983

[51] Int. Cl.⁶ .............................................. F16L 25/00
[52] U.S. Cl. .................................. 285/334; 285/390; 285/334.4
[58] Field of Search ..................... 285/334.4, 334, 333, 285/390, 175

[56] References Cited

U.S. PATENT DOCUMENTS

| | | | |
|---|---|---|---|
| 951,704 | 3/1910 | Schmidt | 285/334.4 X |
| 2,006,520 | 7/1935 | Stone et al. | |
| 2,211,179 | 8/1940 | Stone | 285/334 |
| 2,239,942 | 4/1941 | Stone et al. | 285/334.4 X |
| 2,258,066 | 10/1941 | Oyen | |
| 2,450,453 | 10/1948 | Boehm | |
| 2,505,747 | 4/1950 | Willke | 285/334 |
| 2,774,081 | 11/1951 | Abegg | |
| 2,893,759 | 7/1959 | Blose | 285/334 |
| 2,992,019 | 7/1961 | MacArthur | 285/334.4 X |
| 3,489,437 | 1/1970 | Duret | |
| 3,606,403 | 9/1971 | Medney | 285/334.4 |
| 4,508,375 | 4/1985 | Patterson et al. | 285/334 |

FOREIGN PATENT DOCUMENTS

| | | | |
|---|---|---|---|
| 89253 | 9/1983 | European Pat. Off. | |
| 539139 | 8/1941 | United Kingdom | 285/390 |

Primary Examiner—Eric K. Nicholson
Attorney, Agent, or Firm—Bush, Mosely, Riddle & Jackson

[57] ABSTRACT

Metal-to-metal seals for pin and box member tubular joints are disclosed where mating annular surfaces are machined at slightly different angles such that the bearing load from initial contact is entirely on the leading edge of the pin annular surface and the trailing edge of the box annular surface. The mismatch of the sealing surfaces is selected for any particular seal geometry such that at final make-up, the bearing load has a relatively even distribution across the entire sealing surface in contact, thus broadly distributing make-up bearing stresses and minimizing any resulting tendency for galling that may occur, in particular for joints having relatively thick walls for both pin and box members.

11 Claims, 4 Drawing Sheets

TUBULAR COUPLING WITH METAL TO METAL SEAL

BACKGROUND OF THE INVENTION

1. Field of the Invention

This invention relates generally to oil and gas well tubing and more particularly has to do with the construction of high pressure tubular joints operable when made up and run into a well to withstand extreme fluid pressures and for sealing off thereof to prevent escape of high pressure fluid or gas through the tubular assembly at the joints.

2. Description of the Prior Art

The search for oil and gas reserves has brought about the exploration of ever deeper formations. These deeper formations require longer strings of production pipe, casing, liners and drill pipe used in the exploration and production of oil and gas. Such tubular goods are made of steel material. Such wells may be subject to extremely high pressures from formation zones. The increased length of tubular strings imposes the upper portion of the string to very high tensile loads and where high pressure exists from deeper formations, may also expose the upper portion of the string to high internal pressures where there is little or no offsetting external pressure on the tubing. With standard joints there are limitations to the depths to which a string of tubing can be run.

There have been prior art attempts to provide metal-to-metal seals which can withstand the extreme pressures that the tubular joint is required to withhold.

U.S. Pat. No. 2,893,759 issued in the name of Thomas L. Blose, one of the inventors of the present invention, is entitled "Conically Tapered Screw-Type Casing Joint With Metal-To-Metal Seal". The patent discloses a metal-to-metal seal where a different sealing taper is provided on the box and pin sealing surfaces to generate an area of radial deformation of the sealing surfaces upon make-up of the connection. The sealing surface of the pin is provided with a higher taper angle than that of the box sealing surface, so that upon joint make-up a line contact is initially established between the sealing surfaces. Upon further make-up, at least one of the members is deformed radially to generate a surface contact between the sealing surfaces. Since the sealing of the pin has a higher taper or angle of incline with respect to the coaxial axis of the pin and box, the trailing edge of the pin sealing surface is the first to contact the annular sealing surface of the box on initial make-up.

The conical and crown-type metal-to-metal sealing geometries in use today for high pressure joints for the oil and gas industry, typically have pin and box members machined to the same nominal angle of engagement as measured from the tubular axis. This angle is typically between two degrees (2°) and fifteen degrees (15°), but may be of any angle. A typical conical seal of any given width would have both pin and box seals machined to a nominal fourteen degrees (14°) for their entire widths. A crown-type seal of fourteen degrees (14°) is disclosed in U.S. Pat. No. 2,992,019 issued in the name of MacArthur where a crown seal is provided on the pin member and is machined at the same angle as the sealing surface on the box member.

It has been found that for parallel or near parallel mating surfaces such as sealing surfaces of conical or crown-type metal-to-metal seals of the same or substantially the same angles, the bearing loads shift from the leading edge of the seal on initial contact to the trailing edge upon final make-up. Depending on the amount of radial interference induced, the leading seal edge can be depleted of all bearing load as the load is transferred further and further back toward the trailing seal edge with the increase in metal-to-metal interference. At very high levels of interference the trailing edge of the seal can receive bearing loads sufficient to cause not only unnecessarily high stress levels of interference in the seal area, but even yielding of the material in a seal surface. This yielding or plastic metal surface distortion, sometimes also referred to as galling, can lead to the metal-to-metal seal losing its pressure containment ability. For this reason, the amount of interference between sealing members has heretofore been limited to avoid attainment of the galling threshold. This, however, has tended to lower the maximum pressure containment limit of typical metal-to-metal seals, particularly on thick wall, high yield strength tubular goods.

The metal-to-metal seal described in U.S Pat. No. 2,893,759 mentioned above provides that the angle of incline of the sealing surface on the pin member be greater than the angle of incline of the sealing surface on the box member. This arrangement necessarily causes the trailing edge of the pin sealing surface to first come in contact with the sealing surface on the box member and upon further make-up, at least one of the members is deformed radially whereby the bearing load on the final seal is greatly distorted at a particular point, typically the trailing edge of the seal.

It is therefore an object of this invention to provide a metal-to-metal seal in a tubular joint that has a substantially uniform loading distribution across the axial extent of the metal-to-metal contact between the male and female members.

It is a further object of this invention to provide a casing joint with a pin and box member where both internal and external seals are provided, wherein the bearing load distribution across each seal is approximately uniform.

It is a further object of the invention to provide a high strength leak resistant sealing surface in a tubular joint which is better adapted to withstand the high pressures and tensile loads encountered in the exploration and production of deep oil and gas well formations.

SUMMARY OF THE INVENTION

According to the invention, metal-to-metal seals for pin and box member tubular joints are provided where mating annular surfaces are machined at slightly different angles such that the bearing load from initial contact is entirely on the leading edge of the seal. Such a result is accomplished for an internal seal by providing that the angle of incline of the pin sealing surface is less than the angle of incline of the box sealing surface. The result is accomplished for an external seal by providing that the angle of incline of the box sealing surface be less than the angle of incline of the pin sealing surface. The mismatch of the sealing surfaces is selected for any particular seal geometry such that at final make-up, the bearing load has a relatively even distribution across the entire sealing surface in contact, thus broadly distributing make-up stresses and minimizing their negative effects.

BRIEF DESCRIPTION OF THE DRAWINGS

The invention will be more readily understood from the following description of the invention and by reference to the accompanying drawings forming a part thereof wherein one or more examples of the invention is shown and wherein.

DESCRIPTION OF THE INVENTION

Figure 1:
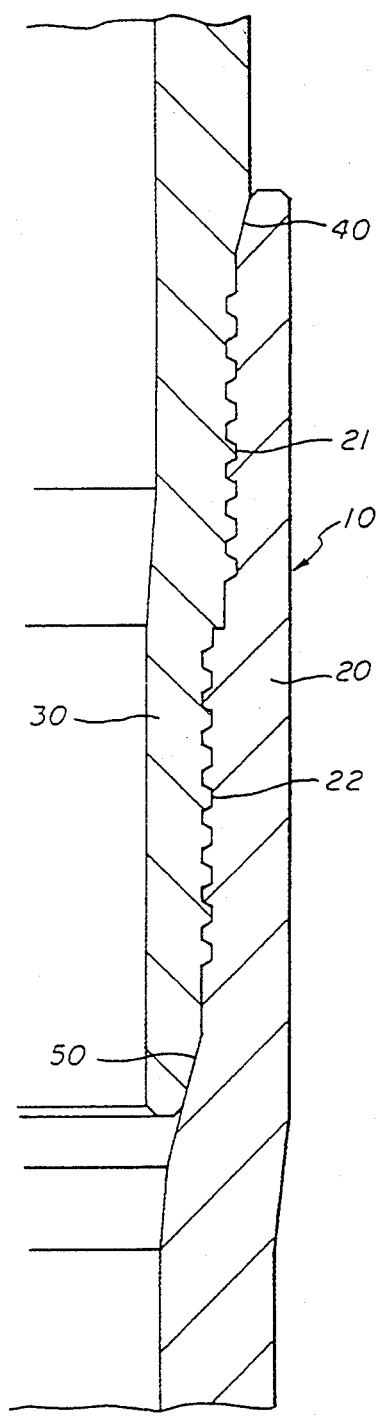
FIG. 1 is a longitudinal section of a fully made-up tubular joint embodying the principles of the invention with only part of the joint being shown, and the rest being broken away.

FIG. 1 shows a typical tubing joint 10 comprising box member 20 and pin member 30 with two step threads 21 and 22. Tubing joint 10 has an external seal 40 and an internal seal 50 for sealing against external and internal pressure differences caused by high pressure fluid and gas, either inside or external to the tubing joint.

Figure 2:
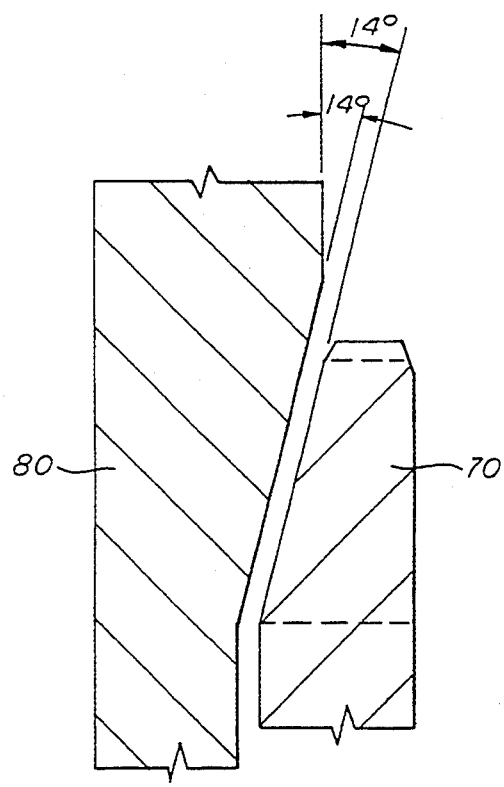
FIG. 2 is a representation of conical sealing surfaces on the box and pin members.

FIG. 2 illustrates a metal-to-metal seal in use today in the oil and gas industry. These seals comprise members machined to the same nominal angle of engagement from the tubing axis. FIG. 2 represents a conical metal-to-metal seal and may be used to represent either an internal seal 50 or an external seal 40 as in FIG. 1. For the case of an internal seal, element 70 represents the pin member while element 80 represents the box member. For the case of an external seal, element 70 represents the box member (element 20 in FIG. 1) while element 80 represents pin member (element 30 in FIG. 1).

The angle of engagement as shown in FIG. 2 for prior art metal-to-metal seals is usually between two degrees (2°) and fifteen degrees (15°) but may be of any angle. For instance, a typical conical seal of a nominal fourteen degrees (14°) of any given width would have both pin and box seals machined to a nominal fourteen degrees (14°) for the entire widths.

Figure 3:
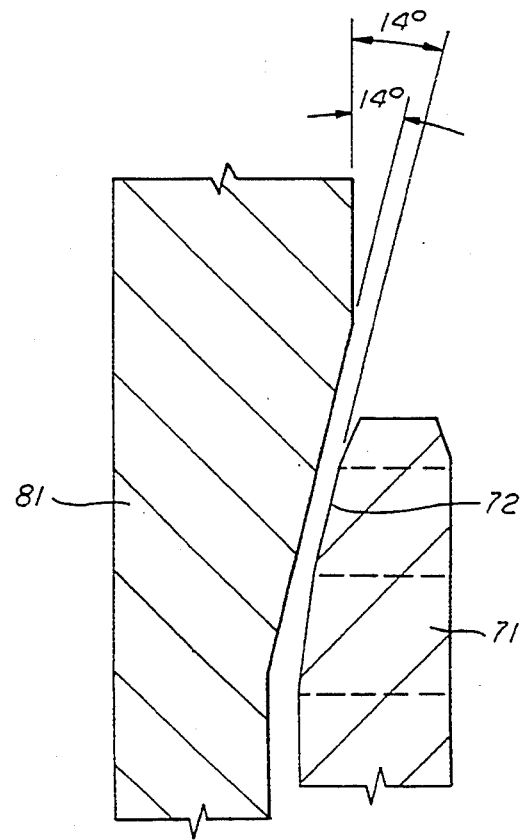
FIG. 3 is a representation of a crown-type seal on a pin member for sealing with a conical surface on the box member.

Similarly, FIG. 3 shows a metal-to-metal seal wherein element 71 represents a crown-type seal where surface 72 is machined to be fourteen degrees (14°) for engagement with a nominal fourteen degree (14°) incline of element 81. As the description of FIG. 2 indicated in a similar fashion, element 81 represents the box member for an internal seal with element 71 being the pin member and vice versa for the external seal illustrated at 40 in FIG. 1.

Figure 4:
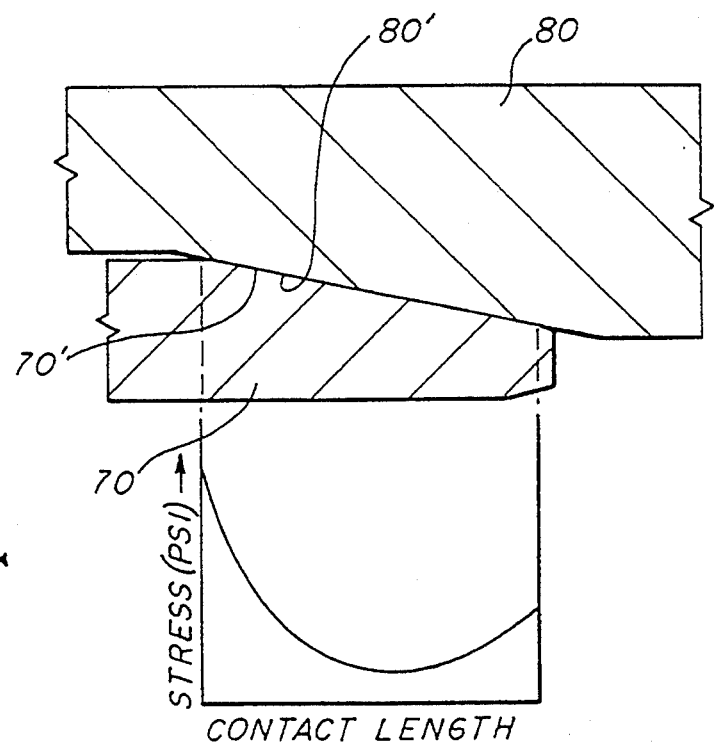
FIG. 4 represents a made-up sealing surface of a box and pin member and shows the stress distribution when the seal is fully made-up.

FIG. 4 illustrates a conical-type seal, where elements 70 and 80 represent either pin and box elements (depending upon whether the seal under review is an internal seal or an external seal) and where the sealing surfaces 70' and 80' are machined to substantially the same angle. A stress distribution representation is illustrated as a function of axial contact length below the contacting surfaces 70' and 80' when the surfaces are fully made-up. FIG. 4 illustrates that higher stress levels in one area of the sealing surface, the trailing edge of the surface, may become extremely high. The leading and trailing edge as used herein are measured with respect to the member having the least thickness of metal, that is with respect to the pin surface for an internal seal, the box surface for an external seal. If the stress level is extreme in one section of the seal, the metal-to-metal seal may become subject to premature galling and the surrounding geometry could become subject to increased incidence of stress induced preferential corrosion or fatigue failure. Similarly, if the bearing load gets too high, the material could yield allowing the possible passage of previously contained fluid or gas.

Figure 5:
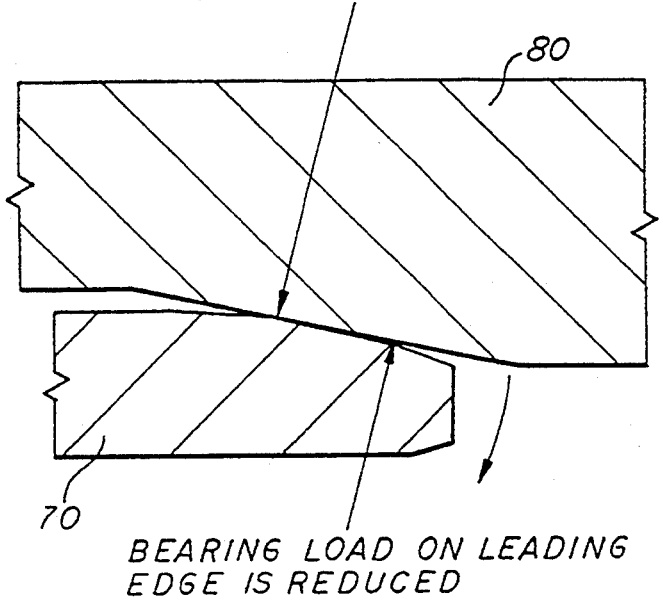
FIG. 5 shows the bearing loads on a fully made-up sealing surface where the angles of incline are substantially the same for the box and pin members.

FIG. 5 illustrates how the extreme high bearing loads on the seals having substantially equal inclining surfaces can cause member 70 to rock about the trailing edge of the sealing surface and ultimately lead to the problems discussed above.

Figure 6:
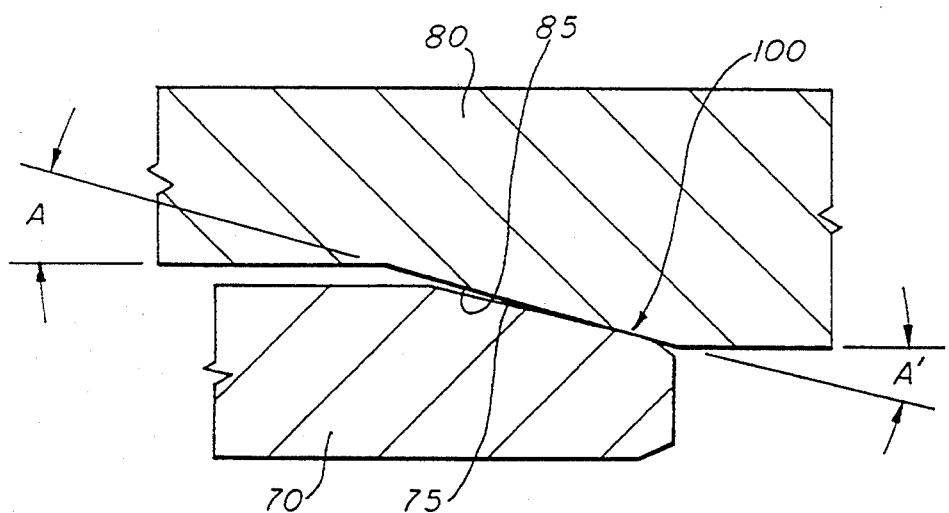
FIG. 6 shows conical sealing surfaces according to the invention where the angle of incline of the pin sealing surface is less than that of the box sealing surface.

FIG. 6 shows a sealing surface according to the invention where the sealing surface 75 is machined at an angle A' with respect to its axis somewhat less than the angle A of sealing surface 85 of element 80. As discussed above if the sealing arrangement of FIG. 6 is used as an internal seal, element 70 represents the pin member 30 and element 80 represents the box member 20. As the element 70, representing a pin member of an internal seal is initially made-up with the female member or box member 80, it makes initial contact with box member 80 at cylindrical line 100. It is apparent that on initial mating, the bearing load is substantially on the leading edge of the pin shoulder and the trailing edge of the box shoulder.

It should be apparent that FIG. 6 also represents the case for an external seal where element 70 represents the box member and element 80 represents the pin member. Where FIG. 6 represents an internal seal, element 70 representing the pin member is machined to be a lower taper or incline angle than that of the box member 80. Where FIG. 6 represents an external seal, the box sealing surface 70 is machined to a smaller angle than that of the pin member 80.

Figure 7:
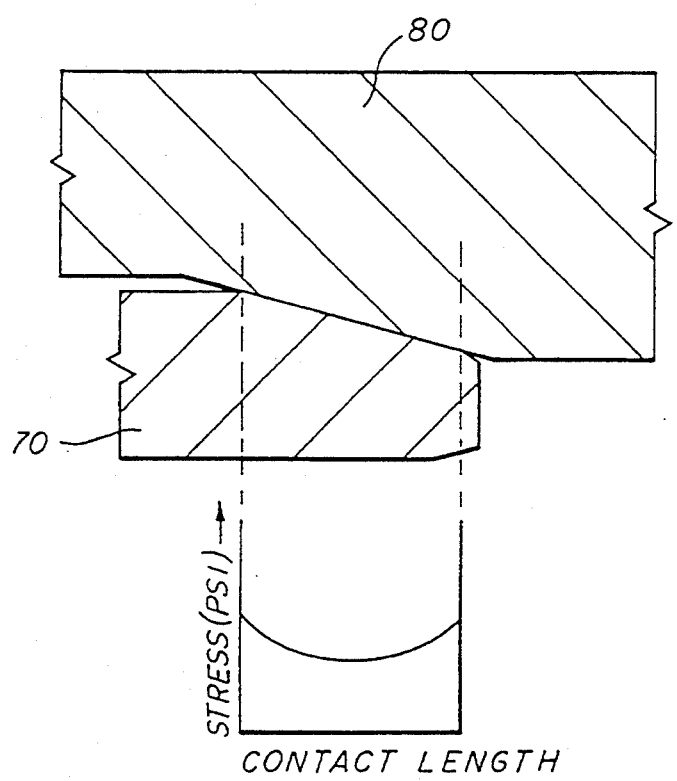
FIG. 7 shows a fully made-up seal between the box and pin members where the angle of incline of the pin member is less than that of the box member and additionally shows the stress distribution across the width of the sealing surface.

FIG. 7 shows the elements 70 and 80 in a fully made-up condition and indicates with a stress versus length diagram beneath the seal that the stress as a function of axial width is uniform and, in this case, a "U" shape.

Figure 8:
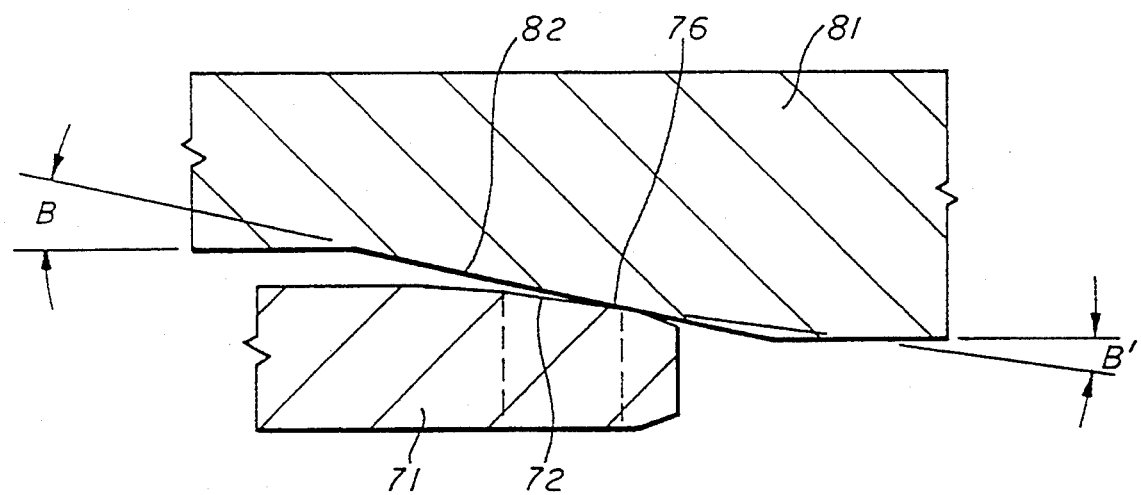
FIG. 8 shows a crown-type sealing surface on a pin member as it initially is being made up with a conical surfaced box member.

FIG. 8 represents a box element 81 and a pin element 71 for an internal seal in which the crown surface 72 of element 71 is adapted for mating with conical surface 82 of element 81. According to the invention, the angle of incline of surface 72 of element 71 is machined to be less than the angle of incline of surface 82 of element 81 such that the leading edge of element 71 engages element 81 at the cylindrical line 76 about the conical surface. FIG. 8 illustrates that the angle B' or the incline of the element 71 about the axis of element 72 is less than the angle B which represents the angle of incline of sealing surface 82 of element 81.

Figure 9:
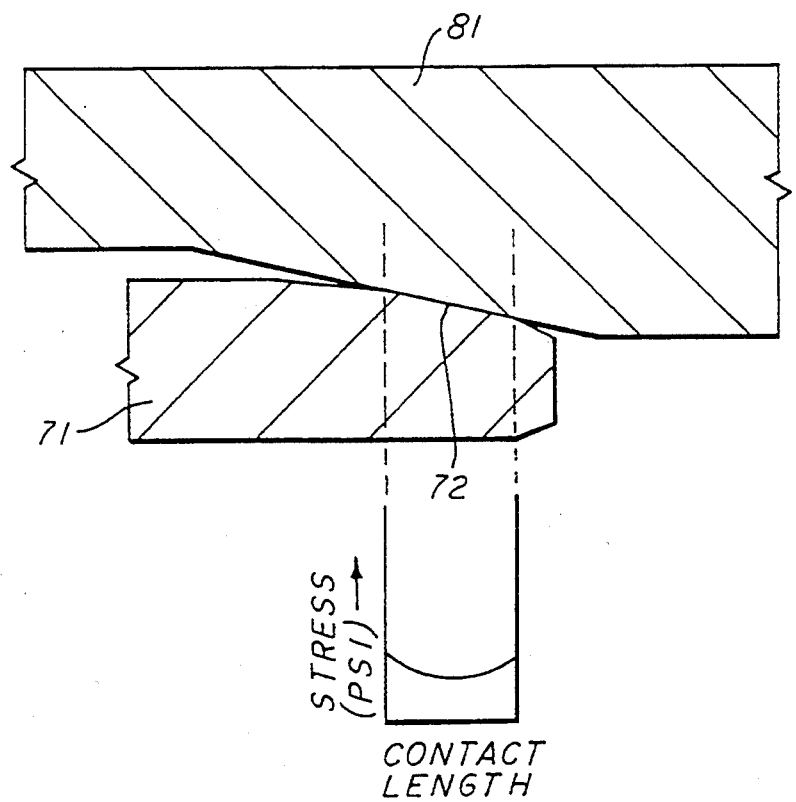
FIG. 9 shows a fully made-up sealing surface of crown-type surface on a pin member and conical box member and showing the stress distribution across the axial width of the sealing surface.

FIG. 9 shows the crown sealing surface 72 of element 71 in the fully made-up position and illustrates the stress distribution across the axial width of the sealing surface. As illustrated, the stress distribution is uniform in width and is "U" shaped. As discussed with respect to FIG. 6 for the conical sealing surfaces, the crown sealing surface represented in FIG. 8 may be located at other regions of the tubular connection and used for either an internal seal, an external seal, or both an internal and an external seal. In this example, an internal seal element 81 would represent the box member while element 71 would represent the pin member. Likewise, for an external seal as at 40 in FIG. 1, element 81 would represent the pin member while element 71 would represent the box member.

According to the invention as illustrated in the sealing arrangements of FIGS. 6 and 8, the exact mismatch of the sealing surfaces will vary depending on the seal angle of the more rigid member, the width of the sealing surface, the thickness of the thinner member relative to its seal diameter, the thickness of the thinner member relative to the thickness of the thicker member at the seal region, desired tolerances, and other factors. For example, it can be shown that seal mismatch for very low angle seals of approximately one-half inch ($\frac{1}{2}$") in axial width can be as low as one quarter degree ($\frac{1}{4}$°), and high angle seals of equal axial width may require a mismatch of one degree (1°) or more for complete balancing of bearing loads upon full make-up. Finite element analysis may be used as a tool to verify the optimum seal angle mismatch on any given seal and connection geometry.

The sealing surfaces according to the invention may be used either singularly as an internal seal, singularly as an external seal, or may be used together in a tubular connection having both an internal and external seal.

From the foregoing, it is apparent that there has been provided a sealing surface for use in joints interconnecting tubular members used in oil and gas wells. Various modifications and alterations in the described structures will be apparent to those skilled in the art from the foregoing description which do not depart from the spirit of the invention. For this reason, these changes are desired to be included within the scope of the appended claims. The appended claims recite the only limitations of the present invention and the descriptive matter which is employed for setting forth the present embodiment and is to be interpreted as illustrative and not limitative.

What is claimed is:

1. A joint adapted for multiple connections and disconnections of oil and gas well pipe sections having an internal bore therein and for sealing against high pressures of such sections comprising, tubular male and female members of high yield strength steel material, said members having companion threads adapted to be screwed together, metal-to-metal seal means on said members located adjacent said threads, said seal means including, first frusto-conical seal surface means on an end of one of said members, second frusto-conical seal surface means adjacent a base of the threads of the other of said members, where the angle of inclination of the generatrix of said first seal surface means with respect to the longitudinal axis of the joint initially is less than the angle of inclination of said second seal surface means with respect to such axis, thereby creating an initial angle mismatch between said first and second seal surface means, so that as said threads are screwed together, a zone of substantially line contact initially is effected between said first frusto-conical seal surface means and said second frusto-conical seal surface means which develops into a substantially full area contact seal of an axial length therebetween when said threads are fully made up, said end of said members on which said first frusto-conical seal surface means is located is characterized by a first wall thickness, said second seal surface means formed at a location of said other of said members is characterized by a second wall thickness, and said second wall thickness is greater than said first wall thickness, and wherein said angle of inclination of said first seal surface means, said initial angle mismatch between said first and second seal surface means, said first wall thickness relative to said second wall thickness, and said axial length of said full area contact between said first and second seal surface means, are so constructed and arranged that the bearing load distribution across said full area contact seal is substantially uniform as characterized by maximum pressures of approximately equal magnitude at each end of said seal and by pressures less than said maximum pressures between said ends of said seal and as a result, said joint has enhanced anti-galling sealing characteristics of said first and second seal surfaces such that said joint may be used for multiple connections and disconnections.

2. The joint of claim 1 wherein
said first frusto-conical seal surface means is on an end of a male member, and said second frusto-conical seal surface means is on a female member, wherein
said metal-to-metal seal means is an internal seal arranged and designed to seal against pressurized fluid in the internal bore of said oil and gas well pipe sections.

3. The joint of claim 1 wherein
said first frusto-conical seal surface means is on an end of a female member, and
said second frusto-conical seal surface means is on a male member, wherein
said metal-to-metal seal means is an external seal arranged and designed to seal said internal bore of said oil and gas well pipe sections against pressurized fluid external of said oil and gas well pipe sections.

4. The joint of claim 1 wherein
said angle mismatch between said first and second seal surface means is substantially less than one degree for approximate uniformity of bearing load distribution across said full area contact.

5. The joint of claim 1 wherein said size of said first thickness relative to the size of said second thickness is a numerical ratio characteristic of threaded connections adapted for use in high pressure oil and gas wells and in pipe section strings subjected to tensile loads which are characteristic of long strings of oil and gas well pipe sections.

6. A joint adapted for multiple connections and disconnections of oil and gas well pipe sections and for sealing against high pressures of such sections comprising, tubular pin and box members arranged for coaxial mating, the box member having, a counterbore for receiving the pin member and having an inwardly facing internal sealing surface inclining at a first angle with respect to the axis of the box member and an inwardly facing external sealing surface inclining at a second angle with respect to the axis of the box member, the pin member having, an internal sealing surface at its free end for coaxial mating with said box member internal sealing surface, said internal pin sealing surface inclining inwardly toward the end of the pin member, the angle of incline of said internal pin sealing surface with respect to the pin axis being less than the box internal first angle, and an external sealing surface at its fixed end for coaxial mating with said box member external sealing surface and having an angle of incline with respect to the pin axis which is greater than said second angle of incline of said box member external sealing surface, and mating threads on the box and pin members respectively spaced between said internal and external sealing surface so that as said threads are screwed together, a zone of substantially line contact initially is effected between corresponding pin and box internal sealing surfaces and corresponding pin and box external sealing surfaces which develop into substantially full area contact internal and external seals having respective axial lengths when said threads are fully made up, and wherein said tubular pin and box members are so constructed and arranged that the bearing load distribution across said full area contact of said internal seal is characterized by maximum pressure of approximately equal magnitude at each end of said seal and by pressures less than said maximum pressure between said ends of said seal, and wherein the bearing load distribution across said full area contact of said external seal is characterized by maximum pressure of approximately equal magnitude at each end of said seal and by pressure less than said maximum pressure between said end of said seal.

7. A pipe joint suitable for repeated use in the oil and gas industry comprising:

male and female members formed from steel material having companion threads adapted to be screwed together; and metal-to-metal high pressure seal means on said members located adjacent said threads, said seal means including first frusto-conical seal surface means on an end of a male member and second frusto-conical seal surface means adjacent a base of the threads of said female member, the angle of inclination of the generatrix of said first seal surface means with respect to the longitudinal axis of said joint initially being less than the angle of inclination of said second seal surface means with respect to such axis, so that as said threads are screwed together a zone of substantially line contact initially is effected between the end of said first frusto-conical seal surface means and said second frusto-conical seal surface means which is developed into substantially full area contact therebetween when said threads are fully made up, said area contact producing a distribution of pressures over said seal surface means that provides a fluid-tight connection which is characterized by a bearing load distribution at final make up as a function of distance along the axial length of the seal of mating box and pin shoulders which is "U" shaped, and which is resistant to galling or seizure of steel material pipes and wherein said metal-to-metal seal means is an internal seal arranged and designed to seal against pressurized fluid in the internal bore of said pipe joint.

8. A tubing joint comprising, tubular pin and box members for coaxial mating, the pin member having a free end and a fixed end, the box member having a counterbore for receiving the pin member and having an annular inwardly facing external sealing surface inclining at an angle with respect to the axis of the joint, the pin member having a conical external sealing surface at its fixed end for coaxial mating with said box member annular sealing surface, said pin external sealing surface facing outwardly toward said sealing surface of said box member, the angle of incline of said external box sealing surface with respect to the axis of the joint being less than the pin external sealing surface incline angle, and mating threads on the box and pin members respectively spaced from said sealing surfaces axially inwardly on the box member and axially toward said free end of the pin member, said inwardly facing external sealing surface of said box member and said outwardly facing external sealing surface of said pin member arranged and designed to cooperatively form an external seal when said mating threads on said pin and box members are fully made up, where an external seal functions primarily to seal the interior of said tubing joint from pressurized fluid external of said tubing joint.

9. The tubing joint of claim 8 wherein on initial mating of said external box sealing surface with said external pin sealing surface, the bearing load is substantially on the leading edge of said box sealing surface with the trailing edge of said pin sealing surface.

10. The tubing joint of claim 8 wherein an angle difference between the box external sealing surface and the pin external sealing surface is selected such that the bearing load across the entire axial length of the seal of mating box and pin sealing surfaces is a relatively even distribution at final make-up.

11. The tubing joint of claim 10 wherein said bearing load distribution at final make-up as a function of distance along the axial length width of the seal of mating box and pin shoulders is "U" shaped.

* * * * *